Patented June 4, 1940

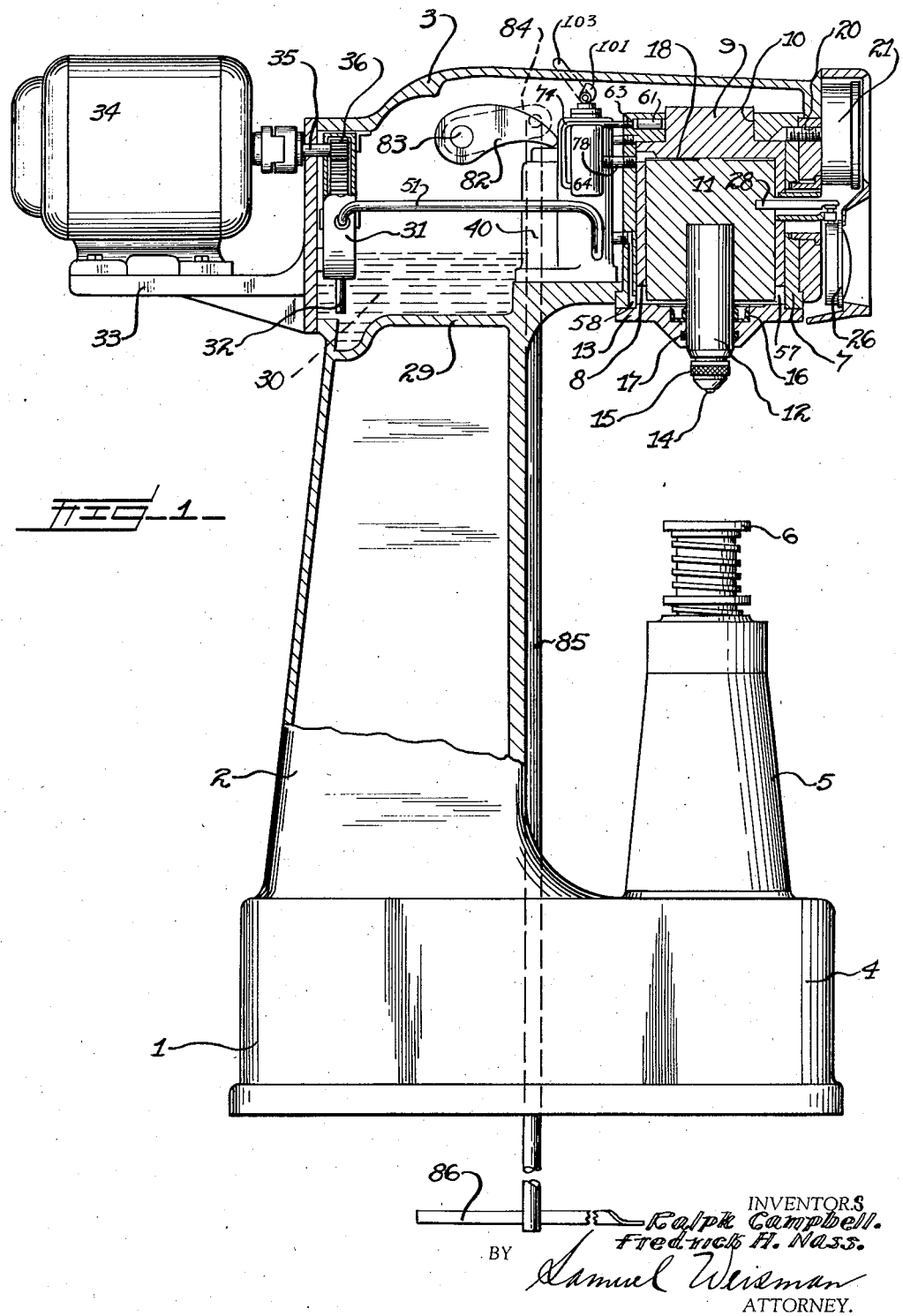

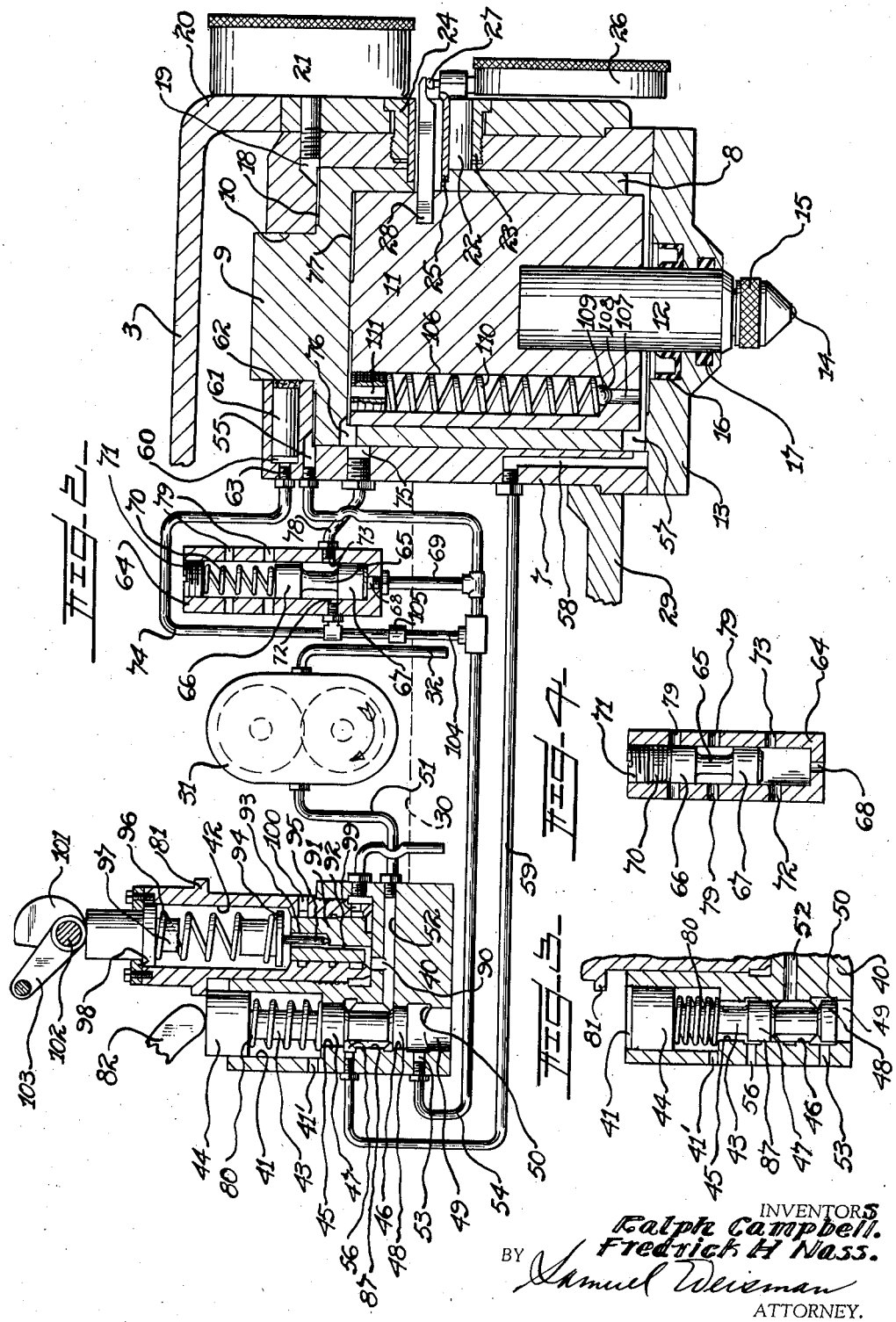
June 4, 1940.  R. CAMPBELL ET AL  2,203,129
HARDNESS TESTING MACHINE
Filed May 19, 1938  2 Sheets-Sheet 2
INVENTORS
Ralph Campbell.
Fredrick H Nass.
BY
Samuel Weisman
ATTORNEY.

2,203,129

UNITED STATES PATENT OFFICE 2,203,129

HARDNESS TESTING MACHINE

Ralph Campbell and Frederick H. Nass, Detroit, Mich., assignors to Detroit Testing Machine Company, Detroit, Mich., a corporation of Michigan Application May 19, 1938, Serial No. 208,794

17 Claims. (Cl. 265—14)

The present invention pertains to a novel machine for testing the hardness of materials, particularly metals, operating on the general principle disclosed in the United States patent issued to Nass and Campbell, No. 2,099,216 of November 16, 1937.

The machine of this invention, as well as that of the patent, operates on the Brinell principle of causing a hard test ball to penetrate into the sample or specimen. The result of the test is expressed preferably in terms of the depth of penetration under a given load or testing pressure. The invention provides further for a pre-load penetration without a corresponding reading on the indicating instrument. The purpose of the pre-load penetration is to bring the test ball into contact with sub-surface metal, thereby breaking through any surface formation or impurities that may exist on the specimen and at the same time taking up any slack or loose play in the machine. After the pre-load pressure has been applied, the higher testing pressure is transmitted to the test ball, and at the same time the recording instrument becomes operative. The shift from the pre-load pressure to the testing pressure, with the simultaneous placing of the indicating instrument in operation, is preferably accomplished by automatic means.

In the above mentioned patent, as well as in other prior art devices, the test ball is returned after the test by means of a spring. Consequently the pressure of the spring must be overcome in applying the operating pressures and hence becomes a component of the pressure values. Due to the variations that occur in springs either in initial production or particularly after usage, an uncontrollable variable is likely to be introduced in the predetermined operating pressures. One of the objects of the invention is to overcome this inaccuracy by the elimination of the return spring and by the use of pressure fluid for returning the test ball to starting position.

This object, as well as the provision for the unrecorded pre-load prior to the test load, is accomplished by the use of two pistons within a cylinder, one piston being nested in the other. The depth indicator is supported by the outer piston to travel therewith, while an indicator-actuating member and the test ball are carried by the inner piston. The pressure fluid system is so constructed as to move both pistons together to effect the pre-load penetration. During this movement, there is obviously no reading shown on the indicator. When the predetermined pre-load pressure has been reached, the pressure fluid is introduced between both pistons, thereby balancing the outer piston and causing the inner piston to move alone. Preferably, a lock is also applied automatically to the outer piston at this time.

The continued movement of the inner piston causes further penetration of the test ball, the depth thereof being shown on the indicator, inasmuch as the indicator itself remains stationary with the outer piston and the indicator-actuating member moves with the inner piston. When the predetermined testing pressure is reached, a control valve in the system operates as a relief valve.

The invention is fully disclosed by way of example in the following description and in the accompanying drawings, in which Figure 1 is a vertical section, partly in elevation, of the complete machine and showing the general assembly thereof;

Figure 2 is a diagrammatic view showing parts of the machine in section and hydraulically connected together;

Figure 3 is a detail section of the control valve in a different position, and

Figure 4 is a detail section of a pre-load valve in a different position.

Reference to these views will now be made by use of like characters that are employed to designate corresponding parts throughout.

In Figure 1 the frame of the machine is shown as comprising a base 1, a standard 2 and a head 3. The base projects beyond the standard at one side, as indicated by the numeral 4, and in this portion is mounted a screw post 5 carrying a work-supporting anvil 6 adjustable vertically to and from the head 3.

Similarly, the head 3 is extended laterally over the portion 4, thereby forming a frame of the G or gap type.

Within the head 3 is formed or mounted a fixed cylinder 7 on a vertical axis preferably common to the axis of the screw post 5. In the cylinder is slidably mounted a hollow piston or piston-cylinder 8 having at its upper end a neck 9 slidably received in a corresponding opening 10 in the top of the cylinder 7. Within the member 8, in turn, is mounted a solid piston 11 carrying a spindle 12 projecting through the base 13 of the head 3 or cylinder 7. The lower end of the spindle carries a testing tool 14 disposed outside of the base 13. The tool is of substantially the same character and held to the spindle by substantially the same means 15 as shown in our United States Patent No. 2,099,216 of November 16, 1937. A cup washer 16 in the base 13 engages the spindle, and beneath this is a suitable dust proof washer 17 consisting of felt wicker or the like.

A peripheral recess 18 is cut in the top of the piston-cylinder 8. In communication with this recess, a hole 19 is formed through the end wall 20 of the head 3 and through the adjacent wall of the cylinder 7, and this hole is brought into communication with a pressure gauge 21 mounted on the wall 20.

Another opening 22 is formed through the wall 20 and the adjacent wall of the cylinder 7. A nut 23 is mounted in the opening, being threaded in the wall of the cylinder 7 and having at its outer end a flange 24 that serves as additional clamping means for the two walls. The member 8 carries a tube 25 projecting through the opening 22, and to the outer end of the tube is secured a depth gauge 26 having its operating stem 27 uppermost. A finger 28 projects from the piston 11 through the tube 25 and is adapted to engage and actuate the stem 27. It may now be seen that the gauge 26 moves bodily with the member 8 and is operated by the finger 28 when the piston 11 moves downward in relation to the member 8.

In the top of the standard 2 (Figure 1) is formed a floor 29 at approximately the level of the cylinder base 13, whereby the head 3 is adapted to serve as a reservoir for containing a quantity of oil 30 or other suitable pressure fluid. A gear pump 31 is mounted in the head with its intake pipe 32 extending into the fluid. Adjacent thereto, on the head, is an outside shelf 33 carrying a motor 34 which drives the pump through a shaft 35 and a pinion 36.

At a suitable position in the reservoir and preferably close to the cylinder 7 is mounted a valve body 40 with two cylinders 41 and 42 formed therein. In the cylinder 41 is mounted a piston valve 43 having at its upper end a head 44 closing the upper end of the cylinder. The cylinder has two seats or restrictions 45 and 46 at which the cylinder may be obstructed by heads 47 and 48 respectively formed on the piston valve. The lower end 49 of the cylinder 41 opens directly into the reservoir, and a restriction 50 is formed at this end as a downward seat for the head. The valve stops against the bottom of the reservoir.

The outlet of the pump 31 is connected by a pipe 51 to a port 52 terminating immediately above the seat 46 in the cylinder 41. Below the seat 46 is a port 53 connected by a line 54 to a port 55 formed in the cylinder 7 and communicating with the recess 18 in the member 8 when the latter is in its uppermost position against the top of cylinder 7, as illustrated in Figure 2. Above the seat 45 is a drain hole 41' placing the adjacent portion of the cylinder 41 in communication with the reservoir. Below the seat 45 is a port 56 for a purpose presently to be described.

When the piston 8 is raised as in Figure 2, it leaves a space 57 in the bottom of the cylinder 7. A passage 58 is formed through the wall of the cylinder 7 in communication with this space. The port 56 is connected by a line 59 to the passage 58.

In the top of the cylinder 7 is formed a horizontal cylindrical recess 60 containing a locking piston 61 with a friction washer 62 at its inner end adapted to engage the neck 9. A port 63 is formed through the wall of cylinder 7 to connect with the recess 60. When the piston 61 is forced against the neck 9, by means presently to be described, the piston 8 is locked against movement.

Suitably positioned within the reservoir is another valve cylinder 64 containing a piston valve 65 with heads 66 and 67 at its ends. In the bottom of the cylinder is a port 68 into which the line 54 is branched at 69. The valve is held downward by a spring 70 adjustable by a screw 71 in the top of the cylinder.

The cylinder is formed with a pair of ports 72 and 73, the latter slightly above the former, and both above the head 67 when the valve is in the lower position, illustrated in Figure 2. The port 72 is connected by a line 74 to the port 63.

Below the port 55, the wall of cylinder 7 has a port 75 communicating at all times with another port 76 through the wall of, and communicating with the interior, of piston 8. The top of the piston 11 is also formed with a peripheral recess 77 communicating with the port 76 even when the piston 11 engages upwardly against the top of member 8, as in Figure 2. The port 73 of valve cylinder 64 is connected by a line 78 to port 75. Additional ports 79 are formed through the wall of cylinder 64 for drainage and venting.

In the operation of the device as thus far described, a compressed spring 80 in cylinder 41 between the seat 45 and head 44 holds the piston valve 43 in its upper position against a stop collar 81 on the valve body 40, as shown in Figure 2. The top of the valve 43 is engaged by a lever 82 on a shaft 83 (Figure 1) from which extends an arm 84. A connecting rod 85 is dropped from the arm to a suitable pedal 86 at the base of the machine, by means of which the valve 43 may be depressed to the seat 50. In the depressed position, the valve blocks the port 56, by engagement of the head 47 with a seat 87 below this port, and establishes communication between ports 52 and 53. Pressure is thus transmitted through line 54 to port 55, whereupon both pistons 8 and 11 move downward together.

When the pressure in line 54 and branch 69 overcomes the spring 70, the valve 65 rises and first uncovers port 72. Pressure is thereby transmitted through line 74 and port 63 to piston 61, whereby the piston 8 is locked against further movement. As the line pressure increases, the valve head 67 uncovers port 73 which delivers pressure fluid through line 78 to ports 75 and 76, as a result of which the piston 11 is moved downward relatively to piston 8.

During these operations the material to be tested for hardness is on the anvil 6 and in contact with the penetrator 14. During the simultaneous movement of pistons 8 and 11, before the ports 72 and 73 are opened, the zero or initial reading of the depth gauge 26 does not change, since the gauge and its operating finger 28 are carried respectively by the pistons 8 and 11. The pressure applied by the penetrator 14 on the specimen during this particular operation is known as the pre-load. The purpose of this penetration is to break through any scale or other foreign matter on the surface of the specimen and to take up any slack that may exist in the apparatus, thereby bringing the penetrator 14 into contact with sub-surface metal. The pre-load pressure is determined by the spring 70 which is adjustable by the screw 71, since the ports 72 and 73 are opened and the piston 11 moves alone only when the fluid pressure overcomes the spring.

The movement of piston 11 relatively to piston 8 causes further penetration of the metal, and this penetration is measured by the action of the finger 28 of the now stationary gauge 26. The test consists in finding the depth of penetration for a given test or load pressure on the piston 11. The means for predetermining the latter pressure will now be described.

The valve body 40 has a port 90 connecting the port 52 to the cylinder 42. The port 90 is normally obstructed by a valve 91 normally resting on the bottom of cylinder 42. The valve has a through aperture 92 enlarged at its upper end as at 93. Over the valve is a spring retainer 94 having a stem 95 seated in the enlargement and of greater length than the enlargement. Thus, the upper end of the valve, which is slightly smaller than the lower end, remains exposed to the pressure fluid that flows through the aperture 92. A spring 96 is mounted on the retainer 94, and on the spring is a head 97 held by a collar 98 upon the cylinder 42.

The cylinder 42 has an outlet port 99 near its bottom and an overflow port 100 slightly higher, both draining into the reservoir.

When the pump pressure exceeds that of the spring 96, the valve 91 is lifted, and the pressure fluid is relieved through the ports 90 and 99 without exerting an operating pressure on either of the pistons 8 and 11. Thus, the spring 97 determines the maximum fluid pressure applied on the piston 11 and penetrator 14.

This pressure, which is the load pressure, can be regulated by a cam 101 on a shaft 102 over the head 97. The shaft carries an arm 102 by which the adjustment is made and which can be locked in the desired position by any suitable means for the purpose. Owing to the slight difference between the areas of the lower and upper ends of the valve 91, a comparatively small adjustment of the head effects a substantial difference in the fluid pressure required to open the valve.

The reading of gauge 26 is taken. This is the maximum penetration of member 14 under the pressure permitted by spring 97. The pressure on pedal 86 is now released, permitting the valve 43 to return to the position in Figure 2, which is the idling position. The pressure fluid now flows from port 52 to valve chamber 46, line 59 and passage 58 to the space 57 beneath the pistons 8 and 11. The lifting of valve 43 brings the line 54 into communication with the reservoir through ports 53 and 49, thereby relieving the pressure on the tops of the pistons 8 and 11 and on the locking valve 65. Pressure is introduced beneath the pistons, and the fluid above piston 8 is displaced through port 55 and line 54. The fluid between the pistons is displaced through ports 76 and 75, line 78 and ports 73 and 72 to a branch line 104 connecting the latter port to line 54. In the branch is inserted a check valve 105 opening in the direction of discharge and closing under compression to obstruct the branch 104 on the power stroke.

If the pump continues to operate, the pressure built up below the pistons is relieved through a check valve in the piston 11. A passage 106 extends from the top nearly to the bottom of the piston and in communication with a smaller passage 107 extending to the bottom and forming a valve seat 108. On the seat is a ball valve 109 backed by a spring 110, the upper end of which is held by an adjustable apertured screw 111. After a given pressure, the ball valve 109 lifts and the fluid escapes from the top of the piston 11 through ports 76 and 75 to the line 78 and valve cylinder 64, from which it is discharged into the reservoir through branch 104.

The pistons 8 and 11 are again brought down in making another test. The fluid beneath them is displaced through passage 58, line 59 and port 41'. It will be evident that the upper portion of cylinder 41 is vented through port 41' on the initial downward movement of valve 43, while cylinder 64 is vented on upward movement of the valve 65 through relief port 79 in the upper portion thereof.

Although a specific embodiment of the invention has been illustrated and described, it will be understood that various alterations in the details of construction may be made without departing from the scope of the invention, as indicated by the appended claims.

What we claim is:

1. In a testing machine, a cylinder structure, a pair of relatively movable pistons therein, a penetrator carried by one of said pistons, fluid pressure means for moving said pistons together, another fluid pressured means operable on only one of said pistons, a fluid pressure operated lock adapted to hold the other piston, whereby to permit relative movement of said pistons, and means for measuring said relative movement.

2. In a testing machine, a cylinder structure, a pair of relatively movable pistons therein, a penetrator carried by one of said pistons, fluid pressure means for moving said pistons together, another fluid pressure means operable on only one of said pistons, a fluid pressure operated lock adapted to hold the other piston, automatic means for actuating said lock and the second means at a predetermined pressure in the first means, whereby to permit relative movement of said pistons, and means for measuring said relative movement.

3. In a testing machine, a cylinder structure, a pair of relatively movable pistons therein, a penetrator carried by one of said pistons, fluid pressure means for moving said pistons together, another fluid pressure means operable on only one of said pistons, a fluid pressure operated lock adapted to hold the other piston, whereby to permit relative movement of said pistons, an indicator carried by one of said pistons, and an indicator-actuating member carried by the other piston.

4. In a testing machine, a cylinder structure, a pair of relatively movable pistons therein, a penetrator carried by one of said pistons, fluid pressure means for moving said pistons together, another fluid pressure means operable on only one of said pistons, a fluid pressure operated lock adapted to hold the other piston, automatic means for actuating said lock and the second means at a predetermined pressure in the first means, whereby to permit relative movement of said pistons, an indicator carried by one of said pistons, and an indicator-actuating member carried by the other piston.

5. In a testing machine, a cylinder structure, a pair of relatively movable pistons therein, a penetrator carried by one of said pistons, fluid pressure means for moving said pistons together, another fluid pressure means operable on only one of said pistons, a fluid pressure operated lock adapted to hold the other piston, whereby to permit relative movement of said pistons, means for measuring said relative movement, and means for rendering the second means inoperative at a predetermined pressure therein.

6. In a testing machine, a cylinder structure, a pair of relatively movable pistons therein, a penetrator carried by one of said pistons, fluid pressure means for successively moving said pistons together and relatively to each other, and means for measuring the relative movement of said pistons, and fluid pressure means for returning said pistons after actuation by the first named means.

7. In a testing machine, a cylinder structure, a pair of relatively movable pistons therein, a penetrator carried by one of said pistons, fluid pressure means for moving said pistons together, another fluid pressure means operable on only one of said pistons, a fluid pressure operated lock adapted to hold the other piston, whereby to permit relative movement of said pistons, and means for measuring said relative movement, and fluid pressure means for returning said pistons after actuation by the first and second means.

8. In a testing machine, a cylinder structure, a pair of relatively movable pistons therein, a penetrator carried by one of said pistons, a preload valve adapted to deliver pressure fluid up to a predetermined pressure to actuate both of said pistons in one direction, said valve being also adapted to balance the pressure on one of said pistons and deliver pressure fluid to the other piston at said predetermined pressure, whereby the last named piston moves relatively to the first, and means for measuring the relative movement.

9. In a testing machine, a cylinder structure, a pair of relatively movable pistons therein, a penetrator carried by one of said pistons, a preload valve adapted to deliver pressure fluid up to a predetermined pressure to actuate both of said pistons in one direction, said valve being also adapted to balance the pressure on one of said pistons and deliver pressure fluid to the other piston at said predetermined pressure, whereby the last named piston moves relatively to the first, and means for measuring the relative movement, and means for discontinuing the supply of pressure fluid to said valve at a predetermined pressure on the last named piston.

10. In a testing machine, a cylinder structure, a pair of relatively movable pistons therein, a penetrator carried by one of said pistons, a preload valve adapted to deliver pressure fluid up to a predetermined pressure to actuate both of said pistons in one direction, said valve being also adapted to balance the pressure on one of said pistons and deliver pressure fluid to the other piston at said predetermined pressure, a lock for the balanced piston operable through said valve at said predetermined pressure, whereby the last named piston moves relatively to the first, and means for measuring the relative movement.

11. In a testing machine, a cylinder structure, a pair of relatively movable pistons therein, a penetrator carried by one of said pistons, a preload valve adapted to deliver pressure fluid up to a predetermined pressure to actuate both of said pistons in one direction, said valve being also adapted to balance the pressure on one of said pistons and deliver pressure fluid to the other piston at said predetermined pressure, a lock for the balanced piston operable through said valve at said predetermined pressure, whereby the last named piston moves relatively to the first, and means for measuring the relative movement, and means for discontinuing the supply of pressure fluid to said valve at a predetermined pressure on the last named piston.

12. In a testing machine, a cylinder structure, a pair of relatively movable pistons therein, a penetrator carried by one of said pistons, a preload valve adapted to deliver pressure fluid up to a predetermined pressure to actuate both of said pistons in one direction, said valve being also adapted to balance the pressure on one of said pistons and deliver pressure fluid to the other piston at said predetermined pressure, whereby the last named piston moves relatively to the first, and means for measuring the relative movement, and fluid pressure means for returning said pistons after the relative movement thereof.

13. In a testing machine, a cylinder structure, a pair of relatively movable pistons therein, a penetrator carried by one of said pistons, a preload valve adapted to deliver pressure fluid up to a predetermined pressure to actuate both of said pistons in one direction, said valve being also adapted to balance the pressure on one of said pistons and deliver pressure fluid to the other piston at said predetermined pressure, whereby the last named piston moves relatively to the first, means for measuring the relative movement, means for discontinuing the supply of pressure fluid to said valve at a predetermined pressure on the last named piston, and fluid pressure means for returning said pistons after the relative movement thereof.

14. In a testing machine, a cylinder, a pair of nested pistons therein, the outer piston being adapted to engage downwardly on the first piston, a penetrator carried by the inner piston, means for supplying pressure fluid at a predetermined pressure on the outer piston to move said pistons together, means for supplying pressure fluid between said pistons whereby to balance the outer piston and move the inner piston relatively thereto, and means for measuring the relative movement of said pistons.

15. In a testing machine, a cylinder, a pair of nested pistons therein, the outer piston being adapted to engage downwardly on the first piston, a penetrator carried by the inner piston, means for supplying pressure fluid at a predetermined pressure on the outer piston to move said pistons together, means for supplying pressure fluid between said pistons whereby to balance the outer piston and move the inner piston relatively thereto, an indicator carried by one of said pistons, and an indicator-actuating member carried by the other piston, whereby to measure the relative movement of said pistons.

16. In a testing machine, a cylinder, a pair of nested pistons therein, the outer piston being adapted to engage downwardly on the first piston, a penetrator carried by the inner piston, means for supplying pressure fluid at a predetermined pressure on the outer piston to move said pistons together, a fluid pressure operated lock for the outer piston, means for simultaneously supplying pressure fluid between said pistons and to said lock, whereby to move the inner piston relatively to the outer piston, and means for measuring the relative movement.

17. In a testing machine, a cylinder, a pair of nested pistons therein, the outer piston being adapted to engage downwardly on the first piston, a penetrator carried by the inner piston, means for supplying pressure fluid at a predetermined pressure on the outer piston to move said pistons together, a fluid pressure operated lock for the outer piston, means for simultaneously supplying pressure fluid between said pistons and to said lock, whereby to move the inner piston relatively to the outer piston, and means for measuring the relative movement, and means for discontinuing the supply of pressure fluid between said pistons at a predetermined pressure.

RALPH CAMPBELL.
FREDERICK H. NASS.